United States Patent
Jennings

[11] Patent Number: 5,844,144
[45] Date of Patent: Dec. 1, 1998

[54] METHOD FOR ESTIMATING FLOW VELOCITY

[76] Inventor: Gordon H. Jennings, 478 Corrida Dr., San Luis Obispo, Calif. 93401

[21] Appl. No.: 810,068

[22] Filed: Mar. 4, 1997

[51] Int. Cl.$^6$ .................................................. G01F 1/66
[52] U.S. Cl. ........................................................ 73/861.25
[58] Field of Search ........................ 342/194; 73/861.25; 367/87, 90; 600/454

[56] References Cited

U.S. PATENT DOCUMENTS

| | | | |
|---|---|---|---|
| 3,610,901 | 10/1971 | Lynch | 342/196 |
| 3,744,015 | 7/1973 | Marimon et al. | 340/3 D |
| 3,950,750 | 4/1976 | Churchill et al. | 342/196 |
| 4,112,430 | 9/1978 | Ladstatter | 342/196 |
| 4,542,657 | 9/1985 | Barber et al. | 73/861.25 |
| 4,616,229 | 10/1986 | Taylor, Jr. | 342/171 |
| 4,644,356 | 2/1987 | Yamano | 342/196 |
| 4,649,395 | 3/1987 | Gellekink et al. | 342/196 |
| 4,809,703 | 3/1989 | Ishikawa et al. | 128/661.08 |
| 4,995,397 | 2/1991 | Noshiyama et al. | 73/861.25 |
| 5,058,594 | 10/1991 | Lazenby | 128/661.08 |
| 5,065,764 | 11/1991 | Nakamura et al. | 73/861.25 |
| 5,662,115 | 9/1997 | Torp et al. | 128/661.09 |

*Primary Examiner*—Ronald Biegel
*Attorney, Agent, or Firm*—Daniel C. McKown

[57] ABSTRACT

In a Doppler system for determining the average flow velocity of a liquid based on reflection from particles moving with the liquid, and in which system the received signal is subjected to both in-phase and quadrature detection, and is then analyzed into frequency domain in-phase channel amplitude and phase components and quadrature channel amplitude and phase components, an improved method for calculating the average flow velocity, comprising discarding those amplitude components for which the in-phase and quadrature phase components differ from approximately +90 degrees and approximately −90 degrees before using the remaining amplitude components to calculate an average amplitude-weighted frequency that is used in estimating the average flow velocity.

2 Claims, 2 Drawing Sheets

METHOD FOR ESTIMATING FLOW VELOCITY

BACKGROUND OF THE INVENTION

1. Field of the Invention

The present invention is in the field of Doppler sonar and more specifically relates to a method for processing a return echo signal to obtain an accurate estimate of the velocity flow of the medium.

2. The Prior Art

As exemplified by the invention described in U.S. Pat. No. 5,421,211 issued Jun. 6, 1995 to Heckman, contemporary liquid flow meters transmit a beam of ultrasonic energy into the liquid in a direction that is generally parallel to or opposite to the direction of flow. A small portion of the transmitted energy is reflected back toward the transmitter by air bubbles or particles in the liquid. This small portion is intercepted by a receiving transducer which produces an electrical signal related to the received energy.

In Heckman, and in U.S. Pat. No. 5,020,374 issued Jun. 4, 1991 to Petroff et al., the signal produced by the receiving transducer is applied to in-phase and to quadrature detectors, then filtered to eliminate the components corresponding to the sum of the frequencies of the transmitted and received energies and to pass the components corresponding to the difference in frequencies, i.e., to the Doppler shift. The filtered signals are then converted to digital form and subjected to a fast Fourier transformation whereby the digitized Doppler signals are converted to amplitude and phase components at various frequencies.

The spectral distributions thus produced include, in addition to the Doppler spectrum, a number of spurious components generated primarily by passage of the sound waves through regions of the liquid that are experiencing turbulent flow, by mechanical vibration, and by electrical noise. To reduce the measuring error caused by these spurious components it is desirable to eliminate the spurious components so far as is practical. It is at this point that the present inventor takes a divergent path from the teachings of Heckman and of Petroff et al.

Heckman teaches two methods. In the first method, if the width of the spectrum is judged to be overly broad, the highest significant spectral component is determined, and it is multiplied by a constant to produce an estimate of the mean liquid velocity. In a second method, if the spectrum is judged to be overly narrow, the spectral peak is determined and multiplied by a (different) constant to provide an estimate of the mean liquid velocity.

Petroff, in U.S. Pat. No. 5,198,989 and Petroff et al. in U.S. Pat. No. 5,020,374 teach multiplying the peak velocity as determined from the spectral distribution by a constant equal to approximately 0.9 to provide an estimate of the mean liquid velocity.

In both Heckman and in Petroff and Petroff et al., the average velocity is found by multiplying some characteristic of the spectrum by an empirical constant. Experience has shown that the proper value for the empirical constant is highly sensitive to flow conditions. Ideally, the empirical constant would be determined through field calibrations under what are hoped to be representative flow conditions.

Further, because of the presence of the spurious spectral components, both the highest significant spectral component and the peak of the spectrum could be in error, which would directly affect the estimate provided of the mean liquid velocity. The present inventor, dissatisfied with these prior art approaches, endeavored to find an improved way of estimating the mean liquid velocity from the spectral components.

SUMMARY OF THE INVENTION

The insight of the present inventor was in recognizing that the spurious spectral components, generated primarily by turbulent flow of the liquid, can be identified and eliminated from the spectrum before the average liquid velocity is calculated, by exploiting the information contained in the phase components. This information was ignored in the prior art methods, and its utilization by the present inventor permits the average liquid velocity to be estimated with greater accuracy than has hitherto been possible.

The preset inventor recognized that for Doppler shifts generated by liquid moving toward the receiving transducer, the in-phase channel signal will differ in phase from the quadrature channel signal by +90 degrees. For liquid flow in the opposite direction, the relative phase between the in-phase channel signal and the quadrature channel signal is −90 degrees. Significantly, the phase relationship for random (turbulent) liquid flow is random.

Therefore, in accordance with the present invention, those spectral components for which the phase difference between the in-phase (I) channel and the quadrature (Q) channel is not equal (approximately) to either +90 degrees or −90 degrees are deleted prior to calculating the average liquid flow velocity.

That is, the average liquid flow velocity is calculated from only those spectral components for which the I channel and the Q channel differ in phase by either +90 degrees or −90 degrees. In this way the errors caused by turbulent flow and other spurious factors are eliminated.

As will be seen below, the present inventor showed in detail how this approach can be implemented using practical apparatus.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
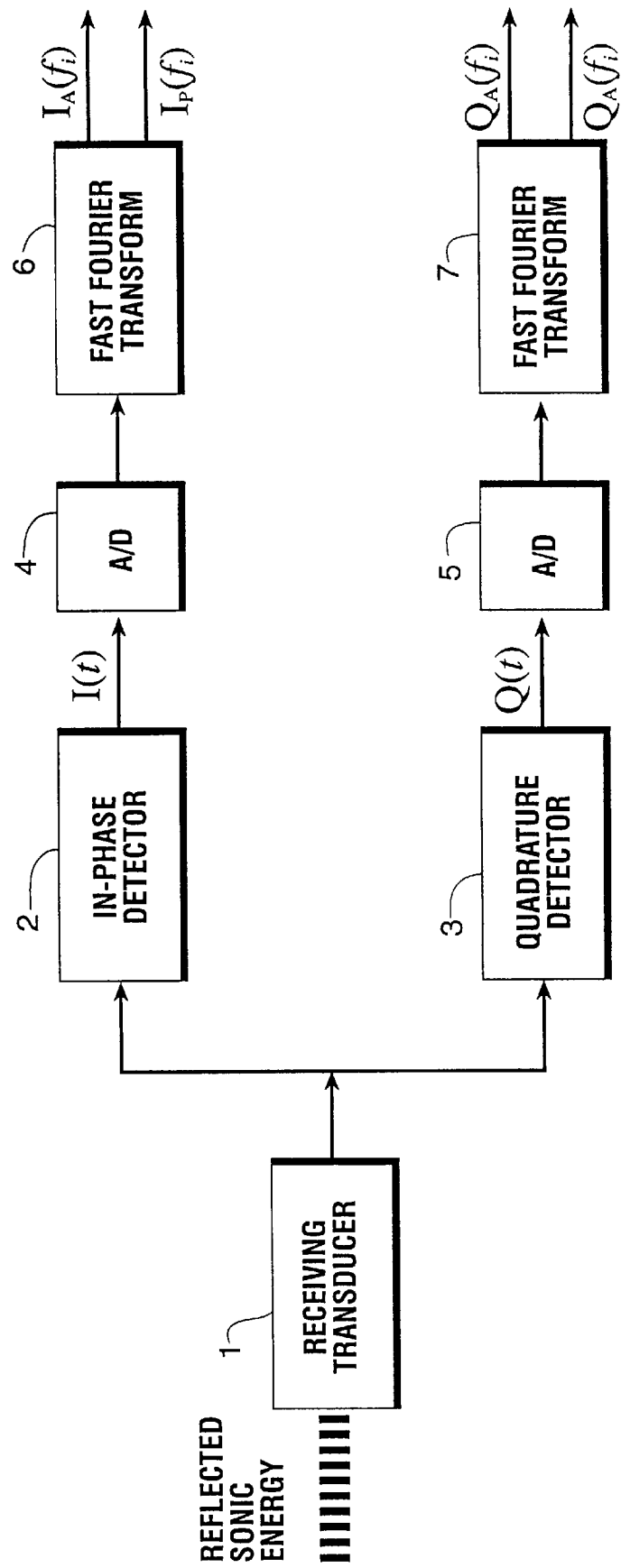
FIG. 1 is a block diagram showing how the in-phase and quadrature signals are processed in a prior art system which is also used in association with the present invention; and, FIG. 2 is a diagram illustrating how certain signals generated in FIG. 1 are analyzed in accordance with the present invention to obtain an average flow velocity.
Figure 2:
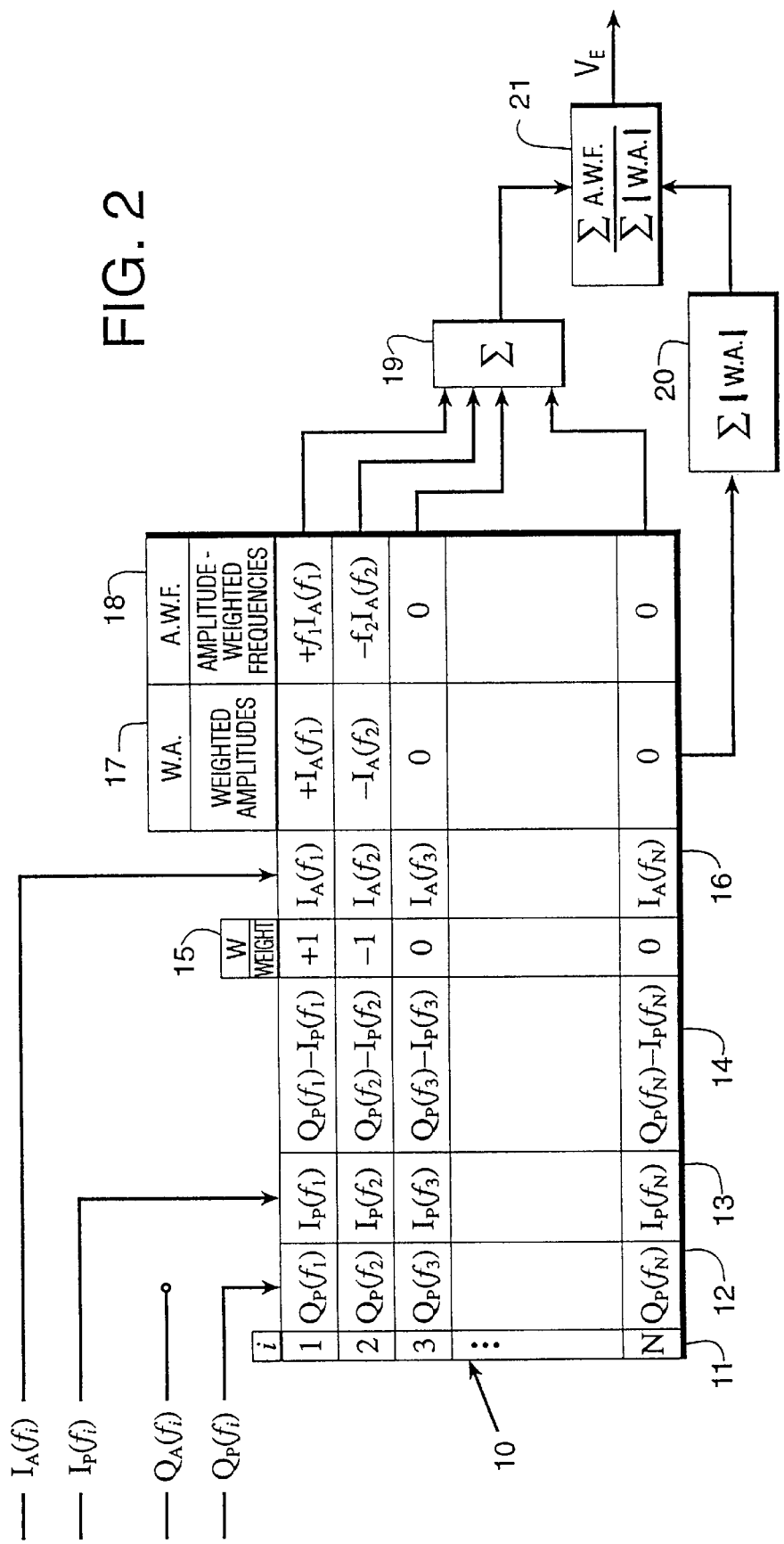

The circuitry shown in FIG. 1 is common to the prior art and to the present invention, however the data processing technique shown in FIG. 2 is believed to be unique to the present invention.

As will be apparent from the following description, the data processing technique of FIG. 2 requires only simple arithmetical operations and storage of numbers and therefore a digital computer is the natural and preferred implementation.

As seen in FIG. 1, reflected sonic energy falling on the receiving transducer 1 is converted to an electrical signal that is applied to an in-phase detector 2 and to a quadrature detector 3. These detectors produce analog signals I(t) and Q(t) respectively.

The analog signal I(t) is applied to an analog-to-digital converter 4 that converts I(t) to digital form. The digitized values of I(t) are then applied to a fast Fourier transform program 6 that converts the signal from the time domain to the frequency domain and produces, as outputs, two sequences that represent the in-phase amplitude component $I_A(f_i)$ and the phase component $I_P(f_i)$, where i=1, 2, 3 . . . N.

Similarly, the output Q(t) of the quadrature detector 3 is applied to the analog-to-digital converter 5 that converts Q(t) to a digital form and applies it to a fast Fourier transform program 7 that produces, as outputs, a quadrature amplitude component $Q_A(f_i)$ and a quadrature phase component $Q_P(f_i)$.

Although fast Fourier transform technology is well-known in this art, it is worth noting that the fast Fourier transform programs 6 and 7 require a number of sampled-data inputs to produce a single set of frequency domain values, and therefore succeeding sets of outputs of the fast Fourier transform programs are produced at a considerably slower rate than the sampling rate of the analog-to-digital converters 4 and 5. Also, as a result of each cycle of operation of the fast Fourier transform programs 6 and 7, there are produced four sequences of numbers: $I_A(f_i)$, $I_P(f_i)$, $Q_A(f_i)$, and $Q_P(f_i)$, where i=1, 2, . . . N. FIG. 2 shows how these sequences of numbers are analyzed in each cycle of operation in accordance with the present invention to produce one estimate of the average flow velocity for each cycle of operation.

Within a random access memory of a computer, a table 10 of FIG. 2 is constructed. For each cycle of operation, the sequence $Q_P(f_i)$ is entered in column 12, the sequence $I_P(f_i)$ is entered into column 13, and the sequence $I_A(f_i)$ is entered into the column 16. The in-phase components $I_P(f_i)$ are subtracted from the quadrature phase components $Q_P(f_i)$, and the phase differences are entered into the column 14. This brings us to the innovative part of the present invention.

The computer is programmed to perform a test on each of the values in the column 14, as follows. First, if the phase difference differs by less than a preselected quantity e from +90 degrees, a weight of +1 is entered in column 15. If the phase difference differs by less than e from −90 degrees, a weight of −1 is entered into column 15. If the phase difference in column 10 is neither approximately +90 degrees nor approximately −90 degrees, a 0 is entered into column 15. The quantity e is a measure of the error that is expected in the measurement of the phase differences.

The computer is programmed to multiply the weight in a particular row of column 15 by the amplitude in the same row in column 16, and the weighted amplitudes are entered into column 17.

The theory behind the use of this test is that if the amplitude component is produced by a single real object, such as a particle moving with the liquid, the phase difference between the in-phase detected signal and the quadrature detected signal should be either +90 or −90 degrees, give or take the measuring error e in determining the phase components. This can be shown by relatively simple algebraic manipulation of elementary trigonometric identities. In the theory of the present invention, phase differences other than +90 or −90 degrees do not result from real physical objects such as particles, and are considered to be spurious signals or artifacts that should be disregarded when one is attempting to estimate the average flow velocity.

The numbers in Column 17 may be thought of as components of the total signal received from a region of space. The frequencies $f_i$ through $f_N$ correspond to flow speeds that are present in the region of space, the + or − signs tell whether the flow is toward or away from the receiving transducer 1, and the amplitudes $I_A(f_i)$ indicate the quantity of signal produced by liquid having the speed corresponding to $f_i$.

If the object of the calculation were to determine the total quantity of signal returned, the result could be obtained by summing the numbers in Column 17, without regard for their + or − signs. This summation $\Sigma |W.A.|$ is indicated in box 20 of FIG. 2.

However, the object of the calculation is to estimate the average velocity of flow in the region of space from which the reflected sonic energy has been received. To obtain the average velocity, each possible velocity (indicated by a frequency $f_i$) is multiplied by a factor $$\frac{I_A(f_i)}{\Sigma |W.A.|}$$

that reflects the fraction of the total signal that is located in the frequency domain at $f_i$, and then summing these products. In the preferred embodiment shown in FIG. 2, the same result is obtained by first summing (in box 19) the amplitude weighted frequencies of column 18, then dividing by the common factor $\Sigma |W.A.|$, as indicated at box 21. The result is the average frequency, which is directly related to the average flow velocity by the well-known Doppler relation $$\frac{\text{average Doppler frequency shift}}{\text{transmitted frequency}} = 2 \frac{\text{average flow velocity}}{\text{speed of sound}}$$

A good discussion of this relationship is found in U.S. Pat. No. 4,542,657 issued Sep. 24, 1985 to Barber et al.

The estimate thus produced could be used in controlling a number of operations, including opening and closing valves to increase or decrease the flow rates or to adapt an existing process to the measured flow rate.

Thus, there has been described a method and apparatus for producing an estimate of the average flow velocity of a liquid based on ultrasonic signals reflected from particles in the fluid and moving with it. The method of the present invention results in a more accurate estimate of the average flow velocity because the estimate is based only on received signals that originate from real objects, and spurious signals are identified and intentionally disregarded.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A method for producing an estimate of the average flow velocity of a liquid that includes regions of turbulent flow, for use with an ultrasonic Doppler flowmeter in which a received signal, reflected from particles in the liquid, is detected by an in-phase detector and by a quadrature detector which produce an I(t) signal and a Q(t) signal, respectively, in which the I(t) and Q(t) signals are digitized and converted to amplitude components $I_A(f_i)$ and $Q_A(f_i)$ and phase components $I_P(f_i)$ and $Q_P(f_i)$, where i=1, 2, . . . N, said method comprising the subsequent steps of:

a) calculating, for each frequency $f_i$, the phase difference $Q_P(f_i)-I_P(f_i)$;

b) assigning a weight of +1 to $I_A(f_i)$ if the phase difference is approximately +90 degrees;

c) assigning a weight of −1 to $I_A(f_i)$ if the phase difference is approximately −90 degrees;

d) assigning a weight of 0 to $I_A(f_i)$ if the phase difference is neither approximately +90 degrees nor approximately −90 degrees;

e) multiplying the amplitude $I_A(f_i)$ by the weight determined in step b), c) or d) to obtain a weighted amplitude (W.A.) corresponding to each frequency $f_i$;

f) multiplying the weighted amplitude by the frequency $f_i$ to obtain an amplitude-weighted frequency (A.W.F.) corresponding to each frequency $f_i$;

g) repeating steps a) through f) for each frequency $f_i$; and, h) summing the weighted amplitudes determined in step e) to obtain W.A.;

i) summing the amplitude-weighted frequencies determined in step f) to obtain A.W.F.;

j) dividing A.W.F. by W.A. to obtain an estimate $V_E$ of the average flow velocity of the liquid, where $V_E$ is measured in units equal to the speed of sound in the liquid.

2. In a Doppler system for determining the average flow velocity of a liquid based on reflection from particles moving with the liquid, and in which system the received signal is subjected to both in-phase and quadrature detection, and is then analyzed into frequency domain in-phase channel amplitude and phase components and quadrature channel amplitude and phase components, an improved method for calculating the average flow velocity, comprising:

discarding those amplitude components for which the in-phase and quadrature phase components differ from approximately +90 degrees and approximately −90 degrees before using the remaining amplitude components to calculate an average amplitude-weighted frequency that is used in estimating the average flow velocity.

* * * * *